United States Patent [19]

Enoshima et al.

[11] 4,424,477

[45] Jan. 3, 1984

[54] APPARATUS FOR PREVENTING A VEHICLE BATTERY FROM BEING OVERDISCHARGED

[75] Inventors: Toshio Enoshima, Fujisawa; Jun-ichi Kuro, Yokohama, both of Japan

[73] Assignee: Nissan Motor Company, Ltd., Yokohama, Japan

[21] Appl. No.: 321,566

[22] Filed: Nov. 16, 1981

Related U.S. Application Data

[63] Continuation of Ser. No. 64,184, Aug. 6, 1979, abandoned.

[30] Foreign Application Priority Data

Aug. 15, 1978 [JP] Japan .................................. 53-111243

[51] Int. Cl.³ ............................................. H02J 7/32
[52] U.S. Cl. ........................................ 320/61; 290/50
[58] Field of Search ................... 320/9, 12, 22, 30, 31, 320/34, 41, 42, 46, 49, 50, 61, 62; 322/10, 11, 14, 38; 290/17, 24, 25, 40, 50, 51; 180/65.1, 65.2, 65.3, 65.4; 307/108

[56] References Cited

U.S. PATENT DOCUMENTS

| | | | |
|---|---|---|---|
| 3,513,325 | 5/1970 | Tharp | 290/40 |
| 3,719,881 | 3/1973 | Shibata et al. | 320/62 |
| 3,991,357 | 11/1976 | Kaminski | 290/50 |
| 4,313,080 | 1/1982 | Park | 320/61 |

Primary Examiner—William M. Shoop
Assistant Examiner—Anita M. Ault
Attorney, Agent, or Firm—Lowe, King, Price & Becker

[57] ABSTRACT

The voltage of the vehicle battery is checked to see whether the voltage is below a predetermined value or not. When the battery voltage is below the predetermined value, the engine crankshaft rotational speed is raised by increasing the amount of air fed to the engine so that the rotational speed of the alternator driven by the engine increases resulting in an increase in the charging current.

15 Claims, 3 Drawing Figures

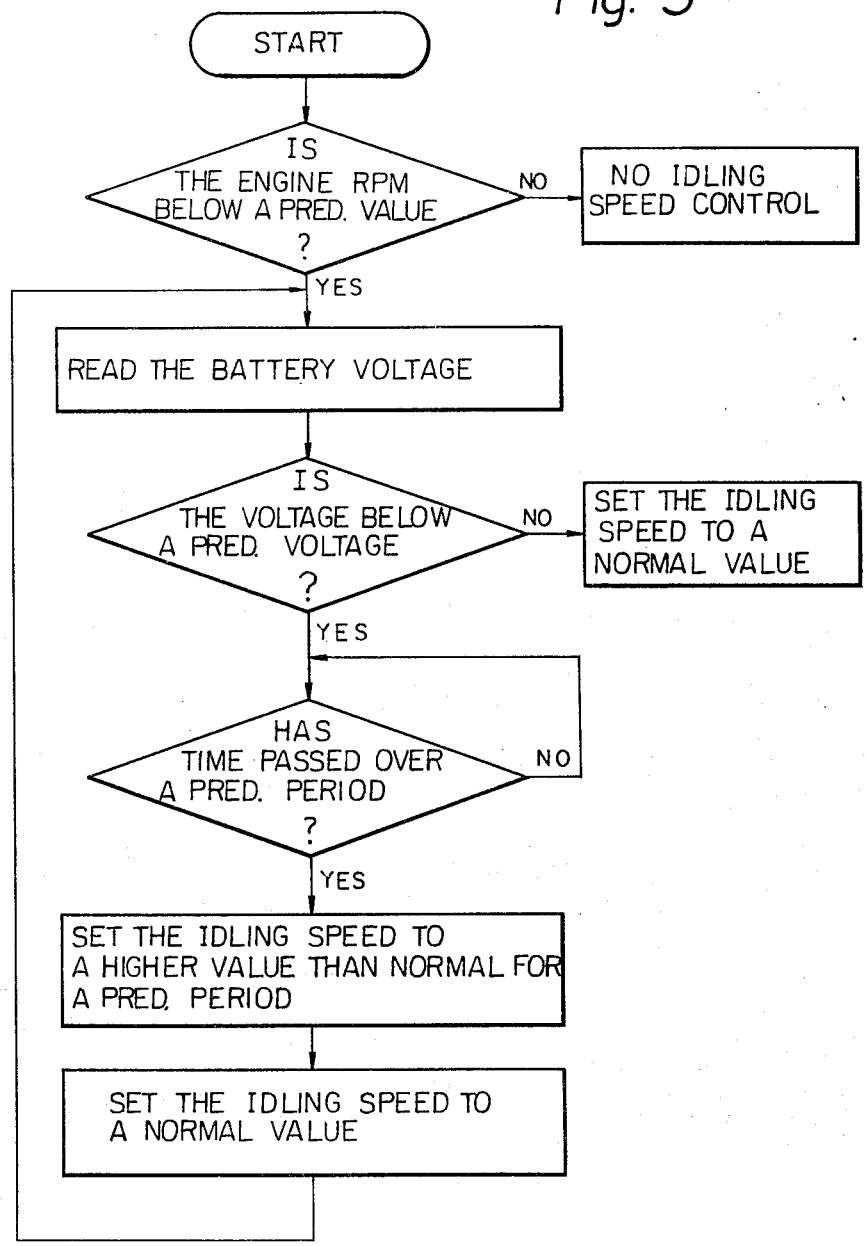

APPARATUS FOR PREVENTING A VEHICLE BATTERY FROM BEING OVERDISCHARGED

This is a continuation of application Ser. No. 064,184 filed Aug. 6, 1979, now abandoned.

FIELD OF THE INVENTION

This invention generally relates to apparatus for protecting a vehicle battery by preventing the same from being overdischarged.

BACKGROUND OF THE INVENTION

The electrical power source system for motor vehicles comprises a dynamo circuit (which usually consists of an alternator, a rectifier and a voltage regulator) and a battery which is arranged to be charged by the output electric current of the dynamo circuit. A.C electric power generated by the alternator is rectified to be converted into a D.C. voltage and is charged into the battery so as to maintain the battery voltage within a predetermined range.

Various electric circuits are connected to the battery to consume the electric power charged in the battery. When the amount of electricity required by these electric circuits (load) is small, no current flows from the battery since a sufficient current flows from the dynamo circuit to the load. However, when a large amount of electricity is consumed by the load, electricity is supplied not only from the dynamo circuit but from the battery to the load. Since the amount of electricity generated by the dynamo circuit depends on the rotational speed of the alternator shaft, therefore the rotational speed of the engine crankshaft, when the engine rotates at a low speed, the amount of electricity generated by the dynamo circuit is small. In other words, if a large amount of electricity is consumed, while engine is operated at a low speed such as the idling speed, the amount of electricity discharged from the battery exceeds the amount of electricity generated by the dynamo circuit to be charged in the battery.

When this undesirable condition continues for a long long period of time, the battery is apt to be overdischarged. As an example, assuming that a vehicle is travelling while the engine thereof operates at a low speed the same or almost the same as the idling speed, when various circuits such as an air conditioner, an electrical rear window defogger, headlamps and windshield wiper circuits, which require a large amount of electric power, are turned on, all of the electric power generated by the dynamo circuit is consumed by the load of the above mentioned power consuming circuits, while the shortage in electric power has to be met by supplying an extra current from the battery. When the engine and the electric circuits are operated under this condition for a long period, the voltage of the battery lowers widely because of overdischarge. Such overdischarge of the vehicle battery causes the starting motor of the engine to receive insufficient electric power from the battery so that engine starting operation is not satisfactorily performed. In addition to this problem, when the battery is overdischarged, the life of the battery is likely shortened.

According to a conventional countermeasure which has been taken hetherto against the above described undesirable overdischarge of the vehicle battery, the engine crankshaft rotational speed is raised, if the engine operates at a low speed such as an idling speed, by a predetermined value whenever a particular power consuming unit is turned on. For instance, when the compressor of the air conditioner mounted on the vehicle is turned on in response to the prescribed increase in the vehicle compartment temperature, additional air is fed to the intake manifold of the engine to raise the rotational speed of the engine crankshaft so that the dynamo circuit generates more electricity. However, according to this technique, the engine crankshaft rotational speed is raised irrespectively of the total amount of electricity consumed by the battery load. As the result, when many power consuming units are simultaneously operated (for instance, when travelling at night in the rain, the headlamps, the windshield wiper circuits, the electrical defogger, and other electrical circuits are simultaneously operated), the amount of electricity supplied from the dynamo circuit as a charging current may be insufficient, resulting in a possibility of overdischarge of the battery.

On the other hand, according to this conventional overdischarge preventing technique since the engine crankshaft rotational speed is raised irrespectively of the state of charging and discharging of the battery, the engine crankshaft rotational speed might be raised wastefully depending on the capacity of the battery and the generating ability of the dynamo circuit so that such a useless increase in engine speed may cause the engine to consume extra fuel, deteriorating the fuel economy.

SUMMARY OF THE INVENTION

This invention has been developed in order to remove the above mentioned drawbacks and disadvantages inherent to the conventional battery overdischarge preventing circuit.

It is, therefore, an object of the present invention to provide apparatus for preventing the vehicle battery from being overdischarged even though a large amount of electricity is continuously consumed by various power consuming units.

Another object of the present invention is to provide apparatus for preventing the vehicle battery from being overdischarged in which the voltage of the battery is maintained over a predetermined voltage.

A further object of the present invention is to provide apparatus for preventing the vehicle battery from being overdischarged so that the life of the battery is not shortened undesirably.

A still further object of the present invention is to provide apparatus for preventing the vehicle battery from being overdischarged by raising the engine crankshaft rotational speed only when it is necessary to increase the charging current so that engine crankshaft rotational speed is not increased wastefully, resulting in improvement of the fuel economy.

BRIEF DESCRIPTION OF THE DRAWINGS

These and other objects and features of the present invention will become more readily apparent from the following detailed description of the preferred embodiments taken in conjunction with the accompanying drawings in which:

FIG. 3 is a flow chart representing the operational sequence of the microcomputer used in the second embodiment.

DETAILED DESCRIPTION OF THE PREFERRED EMBODIMENTS

Figure 1:
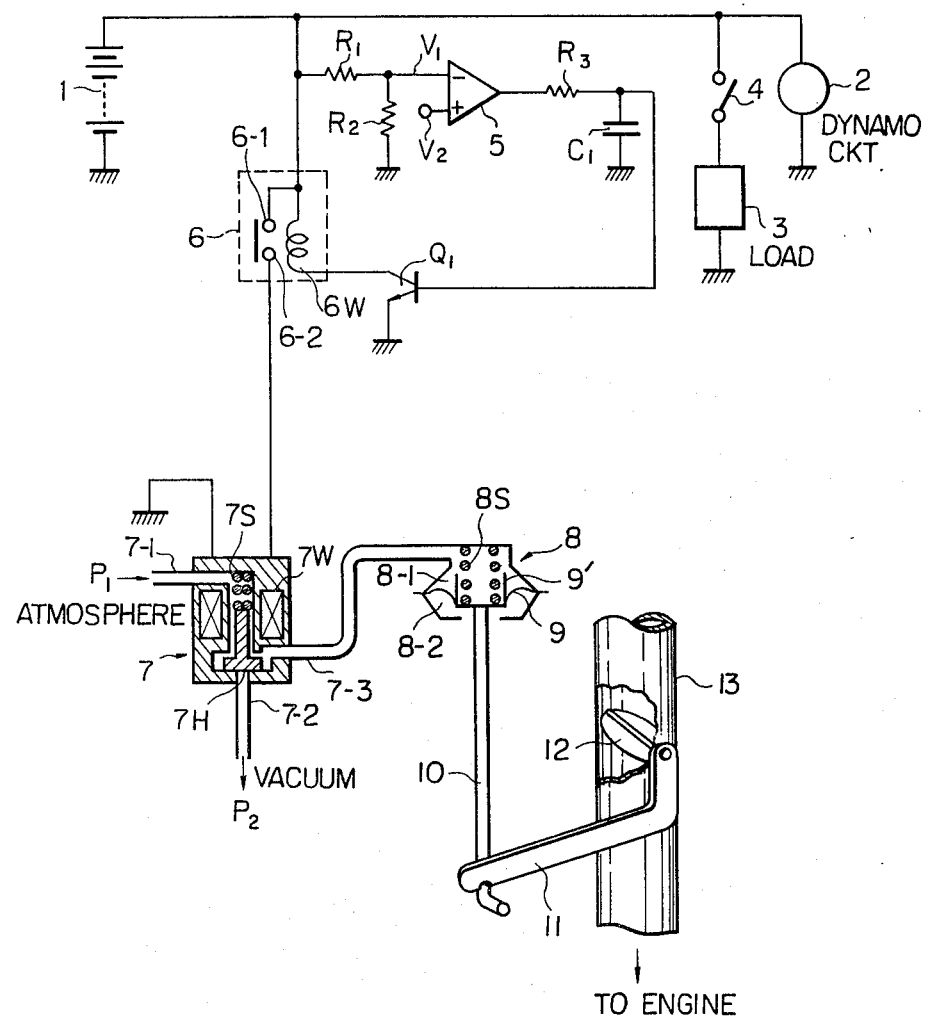
FIG. 1 shows a schematic diagram of a first embodiment of the apparatus for preventing the vehicle battery from being overdischarged according to the present invention.

Referring now to FIG. 1, a schematic representation of the first embodiment of the apparatus for preventing the vehicle battery from being overdischarged is shown. An electric power circuit is simply shown by the combination of a battery 1, a switch 4, various power consuming circuits 3 (load) and a dynamo circuit 2 which usually includes an alternator driven by the engine crankshaft, a rectifier and a voltage regulator which are not shown. The first embodiment apparatus according to the present invention comprises an operational amplifier 5 which functions as a comparator, first to third resistors R1 to R3, a capacitor C1, a transistor Q1, a relay 6, an electromagnetic valve assembly 7, a diaphragm assembly 8, and linkage members 10 and 11. The throttle flap 12 disposed in the intake passage 13 of the internal combustion engine (not shown) of the vehicle is also shown.

The battery 1 has positive and negative terminals respectively connected to a positive output terminal of the dynamo circuit 2 the negative terminal of which is grounded, and to ground. Since all of the circuits are mounted on a vehicle, the chassis or the body of the vehicle serves as ground. The positive terminal of the battery 1 is connected to a stationary contact of the switch 4 which has a movable contact connected to various electrical circuits 3. Although the electrical circuits 3 are shown by a single blank box for simplicity, it may include a plurality of power consuming units, such as an air conditioner, headlamps, an electrical defogger, and windshield wipers. The positive terminal of the battery 1 is connected via the first resistor R1 to an inverting input (−) of the operational amplifier 5, while the inverting input (−) is further connected via the second resistor R2 to ground. These first and second resistors R1 and R2 constitute a voltage divider between the positive terminal of the battery 1 and ground. The operational amplifier 5 has a noninverting input (+) responsive to a predetermined reference voltage $V_2$ which may be produced by a suitable voltage divider and at least one zener diode (not shown). The output of the operational amplifier 5 is connected via the third resistor R3 to the base of the transistor Q1, while the base of the same is coupled via the capacitor C1 to ground. These third resistor R3 and the capacitor C1 constitute a time constant circuit, i.e. a smoothing circuit or an integrator.

The positive terminal of the battery 1 is connected via a winding 6W of the relay 6 to the collector of the transistor Q1, while the positive terminal of the battery 1 is further connected to a first relay contact 6-1 of the relay 6. The emitter of the transistor Q1 is connected to ground so that an electric current will flow through the collector-emitter path of the same when the transistor Q1 is conductive. The relay 6 has a second relay contact 6-2 connected to one terminal of the winding 7W of the electromagnetic valve 7 which has a second terminal connected to ground. The first and second relay contacts 6-1 and 6-2 of the relay 6 are arraged to be bridged when the relay 6 is energized.

The electromagnetic valve assembly 7 has first and second input ports 7-1 and 7-2 respectively communicating with atmosphere and the intake manifold 13. The electromagnetic valve assembly 7 further comprises a valve head 7H arranged to reciprocally move, that is to say the valve head 7H moves upwardly in this figure, against the biasing force of a spring 7s when the electromagnetic valve assembly 7 is energized. The electromagnetic valve assembly 7 has an output port 7-3 which is normally communicated with the first input port 7-1 when the electromagnetic valve 7 is not energized. On the other hand, when the electromagnetic valve 7 is energized, the second input port 7-2 communicates with the output port 7-3.

The output port 7-3 of the electromagnetic valve assembly 7 is communicated via a passage with a first chamber 8-1 of the diaphragm assembly 8 which has a second chamber 8-2 communicating with atmosphere opposite to the diaphragm 9. The diaphragm 9 is biased by the force of a spring 8S disposed in the first chamber 8-1, while a stopper 9' is fixedly attached to the diaphragm 9 in the first chamber 8-1 to limit the movement of the diaphragm 9 to an extent in the direction toward the first chamber 8-1. A rod 10 and a lever 11 are connected between the diaphragm 9 and the throttle flap 12 disposed in the intake passage 13 to link these two members. One end of the rod 10 is fixedly connected to the diaphragm 9, while the rod 10 is extending substantially normal to the diaphragm 9. The rod 10 has an L-shaped portion at the other end and this L-shaped portion is arranged to abut on the lever 11 when the diaphragm 9 moves upwardly in this drawing. Since the lever 11 is fixedly connected to the shaft of the throttle flap 12 which is pivotally disposed in the intake passage 13, the movement of the diaphragm 9 in a direction toward the first chamber 8-1 causes the throttle flap 12 to rotate to open the throttle valve.

Although it is not illustrated, the throttle flap 12 is linked with the accelerator pedal so as to be controlled by the vehicle driver. When the opening angle of the throttle flap 12 exceeds a predetermined value, the lever 11 is located apart from the L-shaped portion by a distance which is larger than the maximum stroke of the rod 10 so that the movement of the diaphragm 9 and therefore, the rod 10 does not cause the throttle flap 12 to rotate.

When the diaphragm 9 moves in a direction toward the second chamber 8-2, the rod 10 also moves in the same direction, viz., downwardly in the drawing. If the accelerator pedal is not depressed, the movement of the rod 10 permits the throttle flap 12 to return to the fully closed position. However, if the throttle flap 12 is controlled by the accelerator pedal, the movement of the rod 10 does not necessarily cause the throttle flap 12 to return to the fully closed position. It will be understood from the above description, that the rod 10 and the lever 11 establish a one-way connection between the diaphragm 9 and the throttle flap 12.

The first embodiment apparatus operates as follows: It is assumed that the standard or rated voltage of the battery 1 is 12 volts. This voltage is divided by a suitable ratio defined by the resistances of the first and second resistors R1 and R2. Assuming that the resistance ratio of the first and second resistors R1 and R2 is 2:1, 4 volts will be developed at the junction between these first and second resistors R1 and R2 when the voltage of the battery 1 equals the above mentioned standard voltage, i.e. 12 volts. This voltage developed at the junction between the first and second resistors R1 and R2 is denoted by a reference $V_1$ and is fed to the inverting input (−) of the operational amplifier 5 to be compared with the reference voltage $V_2$.

The reference voltage $V_2$ which is applied to the noninverting input (+) of the operational amplifier 5 is 4 volts, while this reference voltage $V_2$ is not influenced by the variation of the voltage of the battery 1 inasmuch as this reference voltage $V_2$ is produced by a suitable constant voltage circuit which may include at least one zener diode as described hereinbefore. The operational amplifier 5 produces a low level output signal when the input voltage $V_1$ is above or equal to the reference voltage $V_2$. On the other hand, when the input voltage $V_1$ is below the reference voltage $V_2$, the output signal of the operational amplifier 5 turns to high level. It will be understood from the above, that the reference voltage $V_2$ is set to correspond with the divided voltage when the standard voltage of the battery 1 is applied to the voltage divider. Therefore, the dividing ratio, i.e. the resistance ratio, of the voltage divider and the reference voltage $V_2$ may be set at any value other than this example if the above described relationship is fulfilled. However, it is advantageous to set the reference voltage $V_2$ much lower than the standard voltage of the battery so that the reference voltage never changes.

The output signal of the operational amplifier 5 is applied to the time constant circuit constituted by the third resistor $R_3$ and the capacitor $C_1$. Since the time constant circuit smoothes the voltage of the output signal of the operational amplifier 5, pulsating signals which may appear in the output voltage of the operational amplifier 5 in response to momentary drops or increase in the input voltage $V_1$ will be averaged. When a large amount of load is connected or disconnected by means of the switch 4 to the battery 1, the voltage of the battery 1 is apt to vary for a moment and therefore, without this time constant circuit, the voltage of the battery might be erroneously detected.

The output signal of the time constant circuit, i.e. the voltage developed at the junction between the third resistor $R_3$ and the capacitor $C_1$, is fed to the base of the transistor Q1 to control the same. The transistor Q1 becomes conductive in response to a high level signal applied to the base thereof. When the transistor Q1 is conductive, an electric current flows from the positive terminal of the battery 1 via the winding 6W of the relay 6 to the collector-emitter path of the transistor Q1. The relay 6 is, therefore, energized to close the contacts 6-1 and 6-2 thereof so that an electric current flows via the relay contacts 6-1 and 6-2 to the winding 7W of the electromatnetic valve assembly 7. Upon energization of the winding 7W of the electromagnetic valve assembly 7, the valve head 7H moves upwardly to cut off the communication between the first input port 7-1 and the output port 7-3 and to establish communication between the second input port 7-2 and the output port 7-3 in turn. With this operation vacuum prevailing in the intake passage 13 is induced via the electromagnetic valve assembly 7 into the first chamber 8-1 of the diaphragm assembly 8 so that the diaphragm 9 tends to move toward the first chamber 8-1. The movement of the diaphragm 9 in the direction toward the first chamber 8-1 causes the throttle flap 12 to increase the opening degree, resulting in an increase in the flow rate of the intake air which will be fed to engine cylinders. However, because of the stopper 9', the stroke of the diaphragm movement is limited to an extent defined by the sizes of the stopper 9' and the first chamber 8-1. Accordingly, the opening degree of the throttle flap 12 does not exceed a predetermined value even when the intensity of the vacuum induced into the first chamber 8-1 of the diaphragm assembly 8 is extremely high.

Assuming that the regular idling speed of the engine crankshaft is 700 rpm, engine speed increases to a predetermined speed such as 1,000 rpm but it does not increase more than this predetermined speed unless the accelerator pedal is operated by the vehicle driver. Since the shaft of the alternator included in the dynamo circuit 2 is driven by the engine crankshaft, the rotational speed of the alternator shaft is raised to generate a higher voltage or a larger amount of an electric current. As the result, the battery 1 will be properly charged by the electric current supplied from the dynamo circuit 2 so that the voltage of the battery 1 increases, approaching the standard voltage, i.e. 12 volts in this example.

As the voltage of the battery 1 reaches the standard voltage, the output signal of the operational amplifier 5 turns to low level in the opposite manner to the operation described hereinabove. Consequently, the transistor Q1 becomes nonconductive to deenergize the relay 6 so that the first chamber 8-1 of the diaphragm assembly 8 is communicated via the electromagnetic valve assembly 7 with the atmosphere. The diaphragm 9 returns to the neutral position by the force of the spring 8s and thus the throttle flap 12 is rotated in a direction to close the throttle valve limiting the flowrate of the intake air to its regular idling value. The engine crankshaft speed is set again to the normal idling speed, i.e. 700 rpm in this embodiment. From the foregoing, it will be understood that the engine rpm is raised from the regular idling speed by a predetermined value whenever the voltage of the battery 1 is below a predetermined value which corresponds to the standard voltage.

It is to be noted that the control of the opening angle of the throttle flap 12 is performed only when the opening angle is below a predetermined value. In other words, when the opening angle of the throttle flap 12 is over this predetermined value, the throttle flap 12 is not operated in response to the movement of the diaphragm 9 since the L-shaped portion of the rod 10 does not reach the lever 11. As is well known, when the engine crankshaft rotates at a high speed, the alternator generates a sufficient electric power so that there is no need to further increase the engine rpm in such condition.

Figure 2:
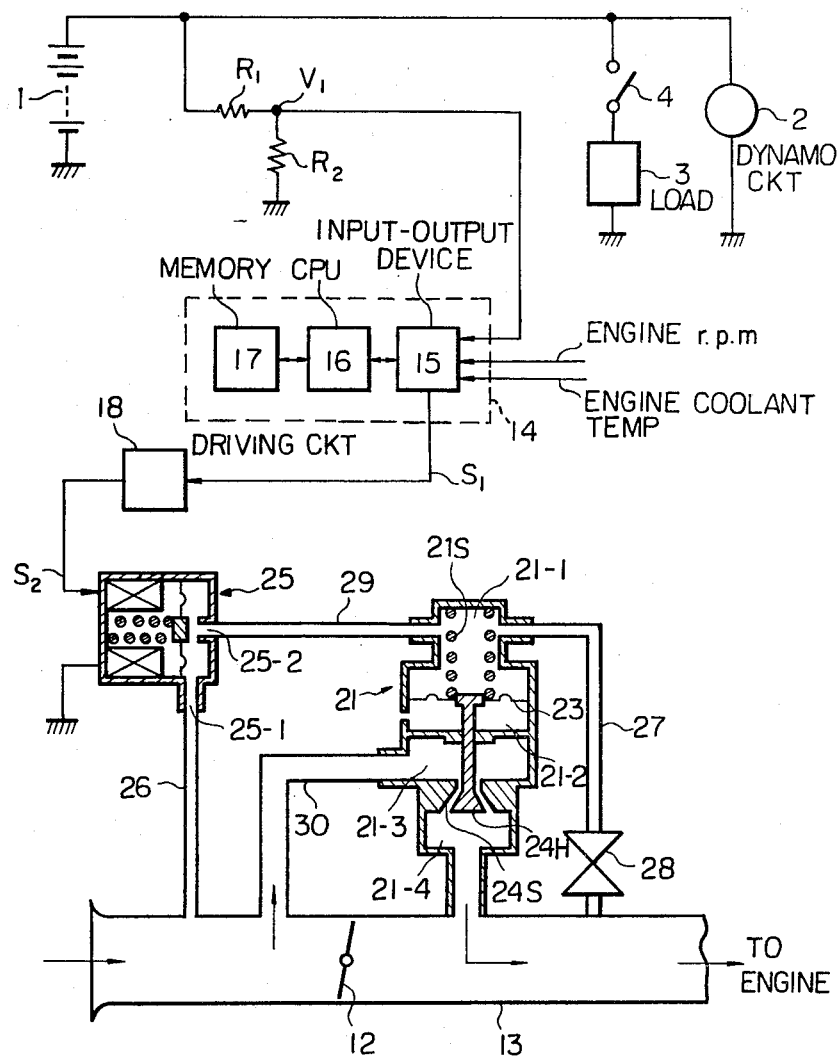
FIG. 2 shows a schematic diagram of a second embodiment of the apparatus according to the present invention.

Reference is now made to FIG. 2 which shows a schematic diagram of the second embodiment of the apparatus for preventing the vehicle battery from being overdischarged. The same circuits and elements as in the first embodiment are designated by the same references. The electric power circuit of a vehicle is schematically illustrated by the combination of a battery 1, a switch 4, various power consuming electrical circuits (load) 3, and a dynamo circuit 2 which usually includes an alternator, a rectifier and a voltage regulator.

The apparatus according to the second embodiment of the present invention comprises a voltage divider which consists of first and second resistors R1 and R2, a microcomputer 14, an electromagnetic valve 25, an air supply valve 21, a constant pressure valve 28, and a by-pass passage 30. Since the electrical power circuit of the vehicle is the same in construction as in the first embodiment, the description thereof is not repeated. The positive terminal of the battery 1 is connected to one end of the first resistor R1 which is connected via the second resistor R2 to ground at the other end. The junction between the first and second resistors R1 and R2 is connected to an input of the microcomputer 14 which includes an input-output device 15, a CPU (central processing unit) 16, and a memory device 17. One example of the operational sequence of the microcomputer 14 is shown in FIG. 3 in the form of a flow chart and will be described in detail hereinlater.

The output of the microcomputer 14 is connected to an input of the driving circuit 18 the output of which is connected to a winding of the electromagnetic valve 25. The driving circuit 18 comprises a pulse generator for generating a pulse driving signal by which the electromagnetic valve 25 is controlled. The electromagnetic valve 25 has first and second ports 25-1 and 25-2 respectively communicating via a passage 26 with the intake passage 13 upstream of the throttle flap 12, and via a passage 29 with a first chamber 21-1 of the air supply valve 21. The air supply valve 21 comprises the above mentioned first chamber 21-1, and a second chamber 21-2 communicating with atmosphere. The air supply valve 21 further comprises a diaphragm 23 arranged between the first and second chambers 21-1 and 21-2, which diaphragm 23 is normally biased toward the second chamber 21-2 by the force of a spring 21s disposed in the first chamber 21-1. A valve head 24H is operatively connected to the diaphragm 23 and is arranged to move reciprocally in accordance with the movement of the diaphragm 23. The air supply valve 21 further comprises a third chamber 21-3 communicating with the intake passage 13 upstream of the throttle flap 12 via the by-pass passage 30, and a fourth chamber 21-4 communicating with the intake passage 13 downstream of the throttle flap 12. The third and fourth chambers 21-3 and 21-4 are communicable with each other via an opening therebetween. The opening functions as a valve seat 24S with respect to the valve head 24H so that the communication between the third and fourth chambers 21-3 and 21-4 is controlled by the movement of the valve head 24H. The first chamber 21-1 is further communicated via a passage 27 with the constant pressure valve 28 which is communicated with the intake passage 13 at the other end thereof downstream of the throttle flap 12 to induce vacuum therein.

The second embodiment apparatus shown in FIG. 2 operates as follows: The voltage of the battery 1 is divided by the voltage divider to develop a voltage $V_1$ proportional to the battery voltage in the same manner as in the first embodiment. This voltage $V_1$ is applied to the microcomputer 14 so that the microcomputer 14 detects whether this voltage $V_1$ is below a predetermined voltage or not. Although the function of the microcomputer 14 is not limited to this comparison, it is assumed that the microcomputer simply generates an output signal $S_1$ when the voltage $V_1$ is below the predetermined voltage.

Upon presence of the output signal $S_1$ of the microcomputer 14 the duty cycle of the pulse driving signal $S_2$ is changed in a manner that the duty cycle increases. The increase in duty cycle of the pulse driving signal $S_2$ causes the electromagnetic valve 25 to lengthen the interval for which the valve 25 opens during one cycle of ON-OFF operation. Meanwhile, a constant vacuum pressure produced by the constant pressure valve 28 is induced into the first chamber 21-1 of the air supply valve assembly 21 so that the diaphragm 23 is biased toward the first chamber 21-1 against the force of the spring 21s. The vacuum prevailing in the first chamber 21-1 is diluted by atmospheric pressure induced via the electromagnetic valve 25 to an extent. However, when the duty cycle of the pulse driving signal $S_2$ is low, the amount of atmospheric air induced into the first chamber 21-1 is not large enough to effectively dilute the vacuum so that the diaphragm 23 is still biased toward the first chamber 21-1. As the result the valve head 24H abuts on the valve seat 24S cutting off the communication between the third and fourth chambers 21-3 and 21-4. Accordingly, no air flows via the bypass passage 30. If the duty cycle of the pulse driving signal $S_2$ is increased as mentioned hereinabove, the amount of air induced into the first chamber 21-1 increases to sufficiently dilute the vacuum therein. The diaphragm 23 is not any more biased toward the first chamber 21-1 and thus the diaphragm 23 tends to move downwardly, i.e. in a direction to the second chamber 21-2, so that the valve head 24H separates from the valve seat 24S permitting communication between the third and fourth chambers 21-3 and 21-4. With this operation, the atmospheric air upstream of the throttle flap 12 is transmitted via the by-pass passage 30 and the air supply valve assembly 21 to the same intake passage 13 downstream of the throttle flap 12. Consequently, the amount of air induced into the engine cylinders is increased irrespectively of the opening angle of the throttle flap 12, causing the engine crankshaft to rotate at a higher speed than before.

As the engine crankshaft rotational speed increases, the amount of electricity generated by the dynamo circuit 2 increases in the same manner as in the first embodiment. It will be understood from the foregoing, that according to the second embodiment apparatus, additional air is supplied via the by-pass 30 passage only when the voltage of the battery 1 is below a predetermined value, while such an additional air supply will terminate when the battery voltage reaches the predetermined value which corresponds with the standard voltage.

The second embodiment apparatus is especially advantageous when a microcomputer is already used in a control of an engine and/or a motor vehicle. For instance, when a vehicle is equipped with an idling speed control circuit or system which includeds a microcomputer, the same microcomputer may be used to raise the engine speed to properly charge the battery to prevent the same from being overdischarged. The above mentioned idling speed control circuit performs a feedback control of the engine crankshaft rotational speed in view of engine r.p.m. which may be obtained by means of a suitable tachometer, and engine coolant temperature. When it is intended to add the function of the control of the engine r.p.m. in view of the battery voltage to the above mentioned conventional idling speed control circuit or system, a simple voltage detecting circuit, such as the voltage divider, may be added to the conventional system, while the programme of the microcomputer may be suitably changed to perform the additional control of the engine crankshaft speed in accordance with the battery voltage.

FIG. 3 is a flow chart representing the operational sequence of the microcomputer 14. At the beginning of the operational sequence, the engine crankshaft rotational speed, i.e. engine r.p.m., is detected to see whether the engine r.p.m. is below a predetermined value which is close to but above the normal idling speed. When the answer of this step is NO, control of the engine r.p.m. is not performed since the engine operates at a higher speed than the normal idling speed thus there is no need to increase the engine r.p.m.

When the engine r.p.m. is below the predetermined speed and therefore the answer of this step is YES, the voltage of the battery 1 is read by the microcomputer 14. In the following step, the voltage of the battery 1 is detected to see whether it is below a predetermined reference voltage. If the voltage is over or equal to the reference voltage, the idling speed is set to a normal value. However, when the voltage is below the reference value, the following step takes place to see whether this condition lasts over a first predetermined period of time. The function of this step corresponds to that of the time constant circuit in the first embodiment since the following step starts only when the above described condition continuously lasts for the first predetermined period of time.

When it is detected that the low voltage condition has lasted for the first predetermined period of time, the engine idling speed is set to a higher value than the normal idling speed, and this condition lasts for a second predetermined period of time. After this second predetermined period of time, the engine idling speed is reset to the normal idling speed. As the engine r.p.m. is reset to the normal idling speed, the operational sequence returns to the step of reading the voltage of the battery 1 so that the same sequence is repeated.

It is to be noted that the voltage of the battery 1 is not detected during the higher speed operation since the voltage of the battery 1 is instantaneously high whenever the engine r.p.m. is higher than the normal idling speed. If the voltage of the battery 1 were detected during the high speed operation of the engine, an undesirable hunting phenomenon would occur in the engine speed control. Therefore, according to the second embodiment of the present invention, the engine r.p.m. is maintained at a higher value for a predetermined period of time irrespectively of the voltage of the battery after it has been detected that the battery voltage is below the reference voltage.

Although it is not illustrated in the flow chart of FIG. 3, the duty cycle of the pulse driving signal $S_2$ is changed in order to precisely set the idling speed of the engine at the normal idling speed or the higher idling speed. Furthermore, the feedback control of the engine crankshaft rotational speed may be performed in view of the engine r.p.m. and the engine coolant temperature during idling operation. Therefore, when it is intended to set the idling speed to the normal idling speed, the duty cycle of the pulse driving signal $S_2$ is so controlled that the engine r.p.m. approaches the normal idling speed as close as possible, while the engine r.p.m. is raised to an extent when the engine coolant temperature is below a predetermined value so as to warm up the engine within a short period of time.

What is claimed is:

1. An apparatus for preventing a battery of a vehicle from being overdischarged, comprising:
    (a) first means for measuring the voltage of said battery while an engine of said vehicle is running;
    (b) second means responsive to said first means for generating an electric output signal when the battery voltage is below a predetermined value; and
    (c) third means responsive to said second means for raising the engine crankshaft rotational speed from an idling speed, defined as occurring when the engine is idling, to a predetermined higher speed when the voltage of said battery is below said predetermined value.

2. An apparatus as claimed in claim 1, wherein said first means comprises a voltage divider for dividing the voltage of said battery and said second means comprises a comparator responsive to the output voltage of said voltage divider and to a constant reference voltage.

3. An apparatus as claimed in claim 2, further comprising a time constant circuit for smoothing the output voltage of said comparator.

4. An apparatus as claimed in claim 1, wherein said first means comprises a voltage divider for dividing the voltage of said battery and said second means comprises a microcomputer responsive to the output voltage of said voltage divider for producing said ouput signal when said voltage is below said predetermined value.

5. An apparatus as claimed in claim 4, further comprising a speed detecting means for measuring a crankshaft rotational speed of said engine.

6. An apparatus as claimed in claim 5, wherein said microcomputer is programmed to perform the following operational sequence:
    (a) detecting whether the engine crankshaft rotational speed measured by said speed detecting means is below a predetermined value;
    (b) reading the voltage of said battery measured by said first means when said engine crankshaft rotational speed is below said predetermined value;
    (c) detecting whether the voltage of said battery is below a predetermined voltage as determined by said second means;
    (d) controlling said third means to set the idling speed of said engine crankshaft to a normal value when the voltage of said battery is above or equal to said predetermined voltage;
    (e) detecting whether a first predetermined period of time has passed when the voltage of said battery is below said predetermined voltage;
    (f) controlling said third means to set the idling speed of said engine to a higher value than the normal idling speed for a second predetermined period of time when the voltage of said battery is below said predetermined voltage for said first predetermined period of time;
    (g) controlling said third means to set the idling speed of said engine to the normal idling speed after said second predetermined period of time; and
    (h) returning to the step of reading the voltage of the battery measured by said first means.

7. An apparatus as claimed in claim 1, wherein said third means comprises a mechanism operatively connected to a throttle flap disposed in an intake passage of said engine, an opening angle of said throttle flap being controlled by said mechanism in reponse to the output signal of said second means.

8. An apparatus as claimed in claim 7, wherein said mechanism comprises:
    (a) an electromagnetic valve assembly having first and second input ports respectively communicating with atmosphere and vacuum pressure, and an output port;
    (b) a diaphragm assembly having first and second chambers respectively communicating with said output port of said electromagnetic valve assembly and atmosphere; and
    (c) linkage means operatively connected to the diaphragm of said diaphragm assembly and said throttle flap for opening the throttle flap to a predetermined angle when the angle of the throttle flap is below said predetermined angle.

9. An apparatus as claimed in claim 8, wherein said linkage means comprises:
(a) a rod fixedly connected at one end thereof to said diaphragm at said second chamber side and extending substantially normal to said diaphragm, said rod having an L-shaped portion at the other end thereof; and
(b) a lever connected to the shaft of said throttle flap at one end thereof, said lever being engaged with said L-shaped portion in such a manner that movement in one direction of said rod causes said throttle flap to open until the opening angle of said throttle flap becomes equal to said predetermined angle.

10. An apparatus as claimed in claim 1, wherein said third means comprises:
(a) a by-pass communicating with the intake passage of said engine upstream and downstream of a throttle flap; and
(b) means for controlling the amount of air passing through said by-pass in response to the output signal of said second means.

11. An apparatus as claimed in claim 10, wherein said controlling means comprises:
(a) a driving circuit which includes a pulse generator for producing a pulse driving signal the duty cycle of which is variable in accordance with the output signal of said second means;
(b) an electromagnetic valve assembly responsive to said pulse driving signal and having first and second ports, said assembly communicating with atmosphere;
(c) a diaphragm assembly having first and second chambers respectively communicating with said second port of said electromagnetic valve assembly and atmosphere;
(d) a vacuum source communicating with said first chamber of said diaphragm assembly; and
(e) a valve interposed in said by-pass passage and having a head thereof operatively connected to the diaphragm of said diaphragm assembly.

12. An apparatus for preventing a battery of a vehicle from being overdischarged, comprising:
(a) first means for measuring the voltage of said battery while an engine of said vehicle is running;
(b) second means responsive to said first means for generating an electric ouput signal when the battery voltage is below a predetermined value; and
(c) third means responsive to said second means for raising the engine crankshaft rotational speed from an idling speed, defined as occurring when the engine is idling, to a predetermined higher speed when the voltage of said battery is below said predetermined value, wherein said third means comprises:
an electromagnetic valve assembly having first and second input ports respectively communicating with atmosphere and vacuum pressure and an output port;
a diaphragm assembly having first and second chambers respectively communicating with said output port of said electromagnetic valve assembly and atmosphere; and
linkage means operatively connected to the diaphragm of said diaphragm assembly and a throttle flap for opening the throttle flap to a predetermined angle when the angle of the throttle flap is below said predetermined angle.

13. An apparatus as claimed in claim 12, wherein said linkage means comprises:
(a) a rod fixedly connected at one end thereof to said diaphragm at said second chamber side and extending substantially normal to said diaphragm, said rod having an L-shaped portion at the other end thereof; and
(b) a lever connected to the shaft of said throttle flap at one end thereof, said lever being engaged with said L-shaped portion in such a manner that movement in one direction of said rod causes said throttle flap angle to become equal to said predetermined angle.

14. An apparatus for preventing a battery of a vehicle from being overdischarged, comprising:
(a) first means for measuring the voltage of said battery while an engine of said vehicle is running;
(b) second means responsive to said first means for generating an electric output signal when the battery voltage is below a predetermined value; and
(c) third means responsive to said second means for raising the engine crankshaft rotational speed from an idling speed, defined as occurring when the engine is idling, to a predetermined higher speed when the voltage of said battery is below said predetermined value; wherein said third means comprises a by-pass passage communicating with the intake passage of said engine upstream and downstream of a throttle flap; and
means for controlling the amount of air passing through said by-pass passage in response to the output signal of said second means.

15. An apparatus as claimed in claim 14, wherein said controlling means comprises:
a driving circuit which includes a pulse generator for producing a pulse driving signal the duty cycle of which is variable in accordance with the output signal of said second means;
an electromagnetic valve assembly responsive to said pulse driving signal and having first and second ports, said assembly communicating with atmosphere;
a diaphragm assembly having first and second chambers respectively communicating with said second port of said electromagnetic valve assembly and atmosphere;
a vacuum source communicating with said first chamber of said diaphragm assembly; and
a valve interposed in said by-pass passage and having a head thereof operatively connected to the diaphragm of said diaphragm assembly.

* * * * *